United States Patent Office 3,227,679
Patented Jan. 4, 1966

3,227,679
EPOXY RESIN COMPOSITIONS
Gordon P. Brown, Schenectady, N.Y., assignor to General Electric Company, a corporation of New York
No Drawing. Filed June 24, 1960, Ser. No. 38,426
9 Claims. (Cl. 260—47)

This invention relates to epoxy resin compositions. More particularly, it relates to new and useful epoxy resin compositions which are cross-linked by means of isocyanate-aryl alkyl amine adducts, said compositions being characterized by desirably long shelf life and being useful for many applications including adhesives, coatings, castings and molding materials.

The use of amines to cure epoxy resins is well known, as is the use of isocyanate materials for the same purpose of cross-linking. It will be appreciated, of course, that the use of isocyanate materials presents a health hazard due to the toxicity of the isocyanate. It is, therefore, the general practice to block or temporarily inactivate the isocyanate groups by reacting them as with a material containing reactive hydrogen, which ties up, masks or blocks some or all of the isocyanate groups at ordinary temperatures, but which will split off at elevated temperatures, regenerating the isocyanate groups so that they may react with the hydroxyl or other reactive group of the epoxy resin, producing a three-dimensional polymer. Among the so-called blocking materials which have been used to temporarily mask the isocyanates are compounds of the phenol type. However, phenol is somewhat toxic in and of itself. Furthermore, if the isocyanate is to be used in curing an epoxy resin, it follows that the phenol must be removed or evolved as by volatilization, since it would dilute the epoxy resin composition. Such volatilization may lead to bubbling or foaming, and even in essentially complete volatilization or removal of the phenol, leave detrimental small molecular weight fractions in the final epoxy resin composition. From the above, it will be quite apparent that there is a definite need for an isocyanate adduct material which can be used to cure epoxy resins, but which at the same time is blocked or masked to curb its toxicity and, furthermore, in which isocyanate groups are blocked with a material which itself is a curing agent for the epoxy resin, so that there is no need for removal of a component of the adduct after it has been decomposed or split apart.

A principal object, therefore, of the present invention is to provide epoxy resin compositions which are cured by an isocyanate adduct, the entire adduct entering into reaction with the epoxy resin to provide a tightly cross-linked three-dimensional polymeric material.

Briefly stated, the present invention relates to epoxy resin compositions which are cured with an adduct or reaction product of a polyisocyanate and an aryl alkyl amine.

Those features of the invention which are believed to be novel are set forth in the claims appended hereto. The invention will, however, be better understood and further objects and advantages appreciated from a consideration of the following description:

The isocyanate materials used in connection with the present invention are polyisocyanates, or those having more than one isocyanate group per molecule. Examples of such polyisocyanates are alkylene diisocyanates, such as ethylene diisocyanate, trimethylene diisocyanate, hexamethylene diisocyanate, propylene-1,2-diisocyanate, and ethylidine-diisocyanate; cyclo-alkylene diisocyanates, such as cyclopentylene diisocyanate; aromatic diisocyanates, such as tolylene diisocyanate; naphthylene diisocyanate, 1,4-phenylene diisocyanate. Other well known polyisocyanates of the above types as well as alkyl aryl diisocyanates among others are useful. Among the triisocyanates which are useful are triphenylmethane triisocyanate, benzene triisocyanate, tolylene triisocyanate, silicon triisocyanate, ethylenetetraisocyanate, and diphenyl triisocyanate. In general, any polyisocyanate or one containing more than one isocyanate group per molecule can advantageously be used herewith.

Polyisocyanates having a greater number of isocyanate groups per molecule than 2 may be prepared by reacting typical diisocyanates such as those above with polyhydric compounds, such as glycerine, trimethylol propane, pentaerythritol, the amounts of polyhydric material being used in equivalent amounts to the diisocyanate.

The blocking agent used in connection with the present invention consists of aryl alkyl amines, including mixtures of such amines. It has been found that only these materials fulfill the requirements of the invention for a reactive material but one which at the same time will not react too readily. For example, it has been found that adducts of polyisocyanates and alkyl amines will not properly split when heated to elevated temperatures. On the other hand, adducts of aryl amines and polyisocyanates have a short shelf life, measured in days and weeks, i.e., the reaction between such adducts and the epoxy resin will take place at room temperature over relatively short periods of time. On the other hand, it has been unexpectedly found that aryl-alkyl amines require a temperature of about 180° C. for decomposition and reaction with the epoxy resin, and that compositions of such materials with epoxy resins have a shelf life of up to over 5 years or of about 5 years or more. In effect, the polyisocyanate-aryl alkyl amines of the present invention provide a curing agent for the epoxy resin which will not split or be reactive either insofar as the isocyanate group or the amine groups are concerned, until the proper reacting conditions of elevated temperature are met.

Any of the usual aryl alkyl amines are useful in this application including but not limited to N-alkyl anilines, such as N-methyl, N-ethyl, N-n-propyl, N-cyclohexyl aniline etc.; N-alkylhalo anilines, such as N-methyl-o-chloroaniline, N - methyl-p-chloroaniline etc.; N-alkyl toluidines; N-alkyl naphthylamines; N-phenyl benzylamines; and N,N'-diphenyl alkylene diamines, such as N,N'-diphenyl-1,2-ethylene diamine. Others will occur to those skilled in the art.

The epoxy resins or ethoxyline resins which are useful in connection with the present invention are well known and are profusely described in the prior art, including the technical and patent literature. They are disclosed for example in Castan Patent 2,324,483, as well as Castan Patent 2,444,333, British Patent 518,057 and British Patent 579,698. Essentially these ethoxyline resins are based on the resinous product of reaction between an epihalohydrin, for instance, epichlorohydrin and a phenol having at least two phenolic hydroxy groups, for example, bis-(4-hydroxyphenyl) dimethyl propane. Further examples of ethoxyline resins which may be employed in the practice of the present invention are disclosed in U.S. Patents 2,494,295, 2,500,600 and 2,511,913. By reference, the aforementioned patents are intended to be part of the present description of the ethoxyline resins used and, for brevity, then ethoxyline resins will not be described other than that they contain more than one ethylene oxide group, e.g., from one to two or more epoxide groups per molecule and may be prepared by effecting reaction between a polyhydric phenol or alcohol, for example, phenol, hydroquinone, resorcinol, glycerine and condensation products of phenols with ketones, for instance bis-(4-hydroxylphenyl)-2,2-propane, with epicholorohydrin. For example, the reaction of epichlorohydrin with bis-(4-hydroxylphenyl)-2,2-propane may be formulated as follows:

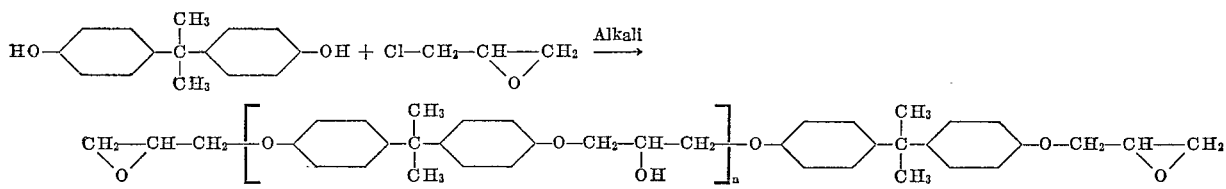

where n has an average value varying from around zero to about 9. Many of these ethoxyline resins are sold under the name of Epon resins by Shell Chemical Corporation, or Araldite resins by the Ciba Company. Data on several of the Epon resins found suitable for the instant purpose are given in the table below:

Table I

| Epoxy Resin | Epoxide Equivalent | M.P., °C. |
|---|---|---|
| Epon 820 | 192 | Liquid |
| Epon 828 | 192 | 9 |
| Epon 834 | 225-290 | 20-28 |
| Epon 1001 | 450-425 | 64-76 |
| Epon 1064 | 300-375 | 40-45 |
| Araldite 6010 | 192 | Liquid |
| Araldite 6020 | 200-205 | Liquid |
| ERL 2774 | 175-200 | Liquid |
| Epi-Rez 510 | 175-200 | Liquid |
| Bakelite 2774 | 190-196 | Liquid |

The complex epoxides used contain epoxide groups or epoxide and hydroxyl groups as their functional groups and are generally free from other functional groups such as basic and acidic groups.

Also included in the present invention are epoxy resins derived from polyfunctional phenols of the novolac type. Such epoxidized novolac resins are produced by the Borden Chemical Company under the trade name Epiphen and by the Dow Chemical Company. Generally, such resins are made by epoxidizing novolac resins which in turn are made in the usual well-known way. Among the patents relating to epoxidized novolac resins is Patent 2,658,885, such patents being familiar to those skilled in the art. Among the specific useful epoxylated novolac resins is Dow D.E.N.–438, which has a molecular weight of 600, a functionality of 3.3, an epoxy equivalent weight of 175 to 182, a specific gravity of 1.220, a viscosity at 125° F. of about 30,000 to 90,000 cps. Epiphen, a product of the Borden Chemical Company, has an epoxy equivalent weight of from about 180 to 200, and a functionality of 3.5 and a specific gravity of about 1.19. The viscosity of this resin at 75° F. is about 750,000 cps., and at 110° F. is about 60,000 cps. Epiphen 847 has an epoxy equivalent weight of 180 to 200, a functionality of 3.3, a specific gravity of 1.12, and a viscosity at 25° F. of from about 75,000 to 150,000 cps. Another epoxylated novolac resin is Dow X–2638.3, having a functionality of 3.2, a viscosity at 125° F. of 425,000 cps., and an epoxy equivalent weight of about 193.

Also useful among the ethoxylene resins are the polyglycidol ether of 1,1',2,2'-tetrakis(hydroxy phenyl)ethane, such resin being known as Epon 1310 and manufactured by the Shell Chemical Company. Other useful materials are the epoxidized polyenes.

Preferably, the adduct and epoxy resin are used in about stoichiometric amounts in order to achieve the best physical characteristics.

The following examples illustrates the preparation of the polyisocyanate materials and their blocking with aryl alkyl amines.

EXAMPLE 1

A triisocyanate was prepared by adding 1044 parts by weights of tolylene diisocyanate dropwise with stirring to 628 parts of trimethylol propane in 648 parts by weight of ethyl acetate. The reaction was carried out in a flask fitted with reflux condenser, stirrer, dropping funnel, and nitrogen inlet tube. Dry nitrogen gas was passed through the reaction mixture during the course of the reaction and after the addition of the tolylene diisocyanate, was complete, the mixture was refluxed for 15 minutes, to obtain the triisocyanate material.

EXAMPLE 2

The triisocyanate of Example 1 was blocked with ethyl aniline as follows. There was added to 436 parts of 66% triisocyanate solution 161 parts of ethyl aniline dissolved in 53.8 parts of ethyl acetate, the addition being made dropwise in apparatus similar to that of Example 1, the addition being made over the course of one hour, during which time the reaction was kept at reflux temperature by the heat of reaction; the resultant material was a triisocyanate blocked with an aryl alkyl amine, in this instance ethyl aniline.

The following examples illustrate the preparation of epoxy resin compositions incorporating aryl alkyl amine blocked polyisocyanate compositions, of the types described above.

EXAMPLE 3

1.2 grams (0.01 equivalent) of ethyl aniline was mixed with 2.2 grams (0.01 equivalent) of the tolylene diisocyanate-trimethylol propane reaction product of Example 1 in solution in 1.1 grams of ethyl acetate and allowed to stand about 10 minutes until the initial heat of reaction had dissipated and the solution was nearly gelled. There were added to this solution 2.0 grams (0.01 equivalent) of Epon 828, together with 4.0 grams of ethyl acetate for solution purposes. The solvent was evaporated off and the cure carried out by heating to about 180° C. for ½ hour. The resulting plastic was hard, inflexible, infusible, and cross-linked.

EXAMPLE 4

There were added to 1.1 grams (0.01 equivalent) N,N'-diphenyl ethylene diamine, 2.2 grams of the reaction product of tolylene diisocyanate and trimethylol propane (Example 1) in 1.1 grams of ethyl acetate. When the heat of reaction had dissipated, there were added to the solution 2.0 grams of Epon 828 and the mixture was cured for about 10 to 15 minutes at 200° C., resulting in an infusible cross-linked material.

EXAMPLE 5

Example 2 was repeated except that instead of an equivalent ratio of ethyl aniline to triisocyanate of 1:1, this ratio was changed to 2:3. Thus, the isocyanate of this example had one free and two blocked isocyanate groups per molecule, as contrasted with that of Example 2, in which all of the isocyanate groups are blocked.

EXAMPLE 6

A molding composition was made by mixing 5.2 grams of Epon 834 on a hot plate with mixing, with 6.0 grams of the polyisocyanate adduct of Example 5. The material of stoichiometric proportions was thoroughly mixed, cooled, solidified, and ground. Five grams of the powder so obtained were cured for ½ hour at 180° C. under 20,-

000 pounds per inch pressure. The electrical characteristics of this material are as follows:

*Table II*

| Temperature | PF | Dielectric Constant |
| --- | --- | --- |
| 25 | 0.54 | 4.4 |
| 50 | 0.65 | 4.3 |
| 75 | 0.78 | 4.3 |
| 100 | 0.99 | 4.3 |
| 125 | 9.2 | 5.1 |
| 150 | 13.8 | 6.7 |
| 25 | 0.47 | 4.1 |

EXAMPLE 7

5.2 grams of Epon 834 were mixed on a hot plate as in the preceding example, with 3.0 grams of the polyisocyanate adduct of Example 5. When cooled, ground and pressed as in the previous example, the electrical properties of the material were found to be as in Table III below:

*Table III*

| Temperature | PF | Dielectric Constant |
| --- | --- | --- |
| 25 | 0.36 | 4.3 |
| 50 | 0.39 | 4.3 |
| 75 | 0.73 | 4.4 |
| 100 | 4.1 | 4.8 |
| 125 | 11.3 | 7.2 |
| 150 | 20.6 | 7.6 |
| 25 | 0.32 | 4.1 |

The higher power factor is attributable to the fact that the adduct-epoxy composition was not stoichiometric as in Example 6.

EXAMPLE 8

A coating composition was made by shaking for about 3 hours 24.2 grams ethyl aniline, 50.6 grams ethyl acetate, 50.6 grams butyl acetate, 50.6 grams Cellosolve acetate, 50.6 grams toluene, 43.8 grams of the triisocyanate of Example 1, 97.4 grams Epon 1001, 0.8 gram cellulose acetate butyrate, and 8 grams of polyvinyl butyral resin. The resulting solution had an efflux time from Zahn cup #2 of 26.3 seconds, and after one week's aging the efflux time had increased only to about 31.2 seconds. This composition when coated on steel panels had favorable characteristics including good abrasion resistance and scratch hardness.

EXAMPLE 9

A casting sample was made by mixing 5.2 grams Epon 834 and 6.8 grams solvent-free blocked polyisocyanate adduct prepared as in Example 2. The constituents were mixed on a hot plate and cured for two hours at 150° C. and ½ hours at 180° C. The electrical properties of this material are as shown in Table IV below.

*Table IV*

| Temperature, ° C. | Power Factor, Percent | Resistivity, ohm cm. | Dielectric Strength, Volts/Mil |
| --- | --- | --- | --- |
| 25 | 0.40 | $7.4 \times 10^{16}$ | 520 (43 mil thick sample). |
| 100 | 3.0 | | |
| 150 | 17.0 | $3.5 \times 10^{11}$ | |

There are provided then by the present invention useful epoxy resin compositions having as a curing agent adducts of polyisocyanates and aryl alkyl amines which obviate the toxicity and handling problems associated with polyisocyanate curing agents as such. Additionally, the adduct splits at elevated temperatures of the order of 150° C. and above and preferably 180° C. to provide not only an isocyanate curing agent but an amine curing agent, the composite material forming tightly cross-linked three-dimensional epoxy resin compositions. The present invention provides materials which as compared to the usual amine-epoxy resin compositions are characterized by an extended shelf life. At the same time, since both components of the adduct serve as curing agents, there is no need as in the usual blocked polyisocyanate materials to volatilize or remove the masking agent from the adduct before it can be usefully employed as a curing agent.

What I claim as new and desire to secure by Letters Patent of the United States is:

1. A heat-curable epoxy resin composition comprising one equivalent of an epoxy resin containing more than 1,2-epoxide group and from 0.5 to 1 equivalent of the reaction product of (1) polyisocyanate and (2) an amine selected from the group consisting of N-alkyl anilines, N-cyclohexyl anilines, N-alkylhalo anilines, N-alkyl toluidines, N-alkyl naphthylamines, N-phenyl benzylamines, N,N'-diphenyl alkylene diamines and mixtures thereof, the proportions of (1) and (2) being such that said reaction product is a material selected from the group consisting of (a) a reaction product in which all isocyanate groups are reacted with said amine, (b) a reaction product in which all but one of said isocyanate groups are reacted with said amine, and (c) mixtures of (a) and (b).

2. A coating composition comprising the epoxy resin composition of claim 1.

3. Molding and casting compositions comprising the epoxy resin composition of claim 1.

4. The heat-reacted composition of claim 1.

5. A heat-curable epoxy resin composition comprising one equivalent of an epoxy resin containing more than one 1,2-epoxide group and from 0.5 to 1 equivalent of the reaction product of (1) polyisocyanate and (2) an amine selected from the group consisting of N-alkyl anilines, N-cyclohexyl anilines, N-alkylhalo anilines, N-alkyl toluidines, N-alkyl naphthylamines, N-phenyl benzylamines, N,N'-diphenyl alkylene diamines and mixtures thereof, the proportions of (1) and (2) being such that said reaction product is a material selected from the group consisting of (a) a reaction product in which all isocyanate groups are reacted with said amine, (b) a reaction product in which all but one of said isocyanate groups are reacted with said amine, and (c) mixtures of (a) and (b), the polyisocyanate being the reaction product of tolylene diisocyanate and a monomeric polyhydric alcohol.

6. A heat-curable epoxy resin composition comprising one equivalent of an epoxy resin containing more than one 1,2-epoxide group and from 0.5 to 1 equivalent of the reaction product of (1) polyisocyanate and (2) ethyl aniline, the proportions of (1) and (2) being such that said reaction product is a material selected from the group consisting of (a) a reaction product in which all isocyanate groups are reacted with said amine, (b) a reaction product in which all but one of said isocyanate groups are reacted with said amine, and (c) mixtures of (a) and (b).

7. The process of curing an epoxy resin composition which comprises adding to one equivalent of an epoxy resin containing more than one 1,2-epoxide group from 0.5 to 1 equivalent of the reaction product of (1) a polyisocyanate and (2) an amine selected from the group consisting of N-alkyl anilines, N-cyclohexyl anilines, N-alkylhalo anilines, N-alkyl toluidines, N-alkyl naphthylamines, N-phenyl benzylamines, N,N'-diphenyl alkylene diamines and mixtures thereof, the proportions of (1) and (2) being such that said reaction product is a material selected from the group consisting of (a) a reaction product in which all isocyanate groups are reacted with said amine, (b) a reaction product in which all but one of said isocyanate groups are reacted with said amine, and (c) mixtures of (a) and (b), and heating to the order of at least 180° C. to decompose said reaction product and cure said epoxy resin.

8. A heat-curable epoxy resin composition comprising one equivalent of an epoxy resin containing more than one 1,2-epoxy group and 0.5 to 1 equivalent of the reaction product of (1) polyisocyanate and (2) an amine selected from the group consisting of N-alkyl anilines, N-cyclohexyl anilines, N-alkylhalo anilines, N-alkyl toluidines, N-alkyl naphthylamines, N-phenyl benzylamines, N,N'-diphenyl alkylene diamines and mixtures thereof, the proportions of (1) and (2) being such that said reaction product is one in which all isocyanate groups are reacted with said amine.

9. A heat-curable epoxy resin composition comprising one equivalent of an epoxy resin containing more than one 1,2-epoxide group and from 0.5 to 1 equivalent of the reaction product of (1) polyisocyanate and (2) an amine selected from the group consisting of N-alkyl anilines, N-cyclohexyl anilines, N-alkylhalo anilines, N-alkyl toluidines, N-alkyl naphthylamines, N-phenyl benzylamines, N,N'-diphenyl alkylene diamines and mixtures thereof, the proportions of (1) and (2) being such that in the reaction product all but one of said isocyanate groups are reacted with said amine.

References Cited by the Examiner

UNITED STATES PATENTS

| | | | |
|---|---|---|---|
| 2,553,718 | 5/1951 | Newey et al. | 260—47 |
| 2,799,663 | 7/1957 | Hampton et al. | 260—47 |
| 2,853,467 | 9/1958 | Bloom et al. | 260—47 |

FOREIGN PATENTS 150,416   3/1953   Australia.

OTHER REFERENCES

Lee et al.: "Epoxy Resins," McGraw-Hill Book Co. 1957, pages 69, 159 and 160.

Winkler: German Pat. No. 1,055,808, April 23, 1959, abstract in Chem. Abstracts, vol. 55, No. 4, page 4047d, February 20, 1961.

WILLIAM H. SHORT, *Primary Examiner.*

PHILIP MANGAN, HAROLD N. BURSTEIN,
*Examiners.*